United States Patent
Kusui et al.

(10) Patent No.: US 10,529,246 B2
(45) Date of Patent: Jan. 7, 2020

(54) LEARNING ASSISTANCE APPARATUS, LEARNING ASSISTANCE METHOD, AND COMPUTER-READABLE STORAGE MEDIUM

(71) Applicant: c/o NEC Solution Innovators, Ltd., Koto-ku, Tokyo (JP)

(72) Inventors: Dai Kusui, Tokyo (JP); Toshiyuki Kamiya, Tokyo (JP)

(73) Assignee: NEC SOLUTION INNOVATORS, LTD., Tokyo (JP)

(*) Notice: Subject to any disclaimer, the term of this patent is extended or adjusted under 35 U.S.C. 154(b) by 161 days.

(21) Appl. No.: 15/560,226

(22) PCT Filed: Mar. 25, 2016

(86) PCT No.: PCT/JP2016/059556
§ 371 (c)(1),
(2) Date: Sep. 21, 2017

(87) PCT Pub. No.: WO2016/153020
PCT Pub. Date: Sep. 29, 2016

(65) Prior Publication Data
US 2018/0053435 A1 Feb. 22, 2018

(30) Foreign Application Priority Data
Mar. 26, 2015 (JP) .................. 2015-064256

(51) Int. Cl.
*G09B 7/02* (2006.01)
*G09B 5/06* (2006.01)
(Continued)

(52) U.S. Cl.
CPC .............. *G09B 7/02* (2013.01); *G09B 5/065* (2013.01); *G09B 19/00* (2013.01); *G06F 3/04883* (2013.01)

(58) Field of Classification Search
CPC ............ G09B 7/02; G09B 5/065; G09B 19/00
See application file for complete search history.

(56) References Cited

U.S. PATENT DOCUMENTS

2009/0172549 A1* 7/2009 Davidson .............. G06F 3/0481
715/732

FOREIGN PATENT DOCUMENTS

| JP | 2012-133470 A | 7/2012 |
|---|---|---|
| JP | 2015-038581 A | 2/2015 |
| WO | 2014/203737 A1 | 12/2014 |

OTHER PUBLICATIONS

Knowledge difficult to get MAX_10052009.pdf, machine translation of website https://wayohoo.com/ios/apps/education/sittetokusuru-nankaigo-max.html, published on Oct. 5, 2009 (Year: 2009).*

(Continued)

*Primary Examiner* — William H McCulloch, Jr.
*Assistant Examiner* — Yingchuan Zhang (57) ABSTRACT

A learning assistance apparatus 10 includes: a data acquisition unit 11 that acquires a problem and an answer corresponding thereto from a data structure that includes the problem and the answer as data; an operation reception unit 12 that receives a first operation of moving a display region in a first direction, a second operation of moving the display region in a second direction, and a third operation of moving the display region in a third direction; and a display control unit 13 that causes another problem to be displayed on a screen according to a movement when the first operation is received after the problem is displayed, causes the answer corresponding to the displayed problem to be displayed on the screen when the second operation is received after the problem is displayed, and causes another problem to be displayed on the screen when the third operation is received after the answer is displayed due to the second operation.

12 Claims, 8 Drawing Sheets

(51) Int. Cl.
G09B 19/00 (2006.01)
G09B 5/04 (2006.01)
G06F 3/0488 (2013.01)

(56) References Cited

OTHER PUBLICATIONS

Communication dated Oct. 2, 2018 by the Japanese Patent Office in counterpart application No. 2017-508452.
Shitte Toku suru Nandokugo MAX, [online], Oct. 5, 2009 URL https://wayohoo.com/ios/apps/education/sittetokusuru-nankaigo-max.html; 12 pages; cited in ISR.
International Search Report for PCT Application No. PCT/JP2016/059556, dated Jun. 21, 2016.

* cited by examiner

LEARNING ASSISTANCE APPARATUS, LEARNING ASSISTANCE METHOD, AND COMPUTER-READABLE STORAGE MEDIUM

This application is a National Stage Entry of PCT/JP2016/059556 filed on Mar. 25, 2016, which claims priority from Japanese Patent Application 2015-064256 filed on Mar. 26, 2015, the contents of all of which are incorporated herein by reference, in their entirety.

TECHNICAL FIELD

The present invention particularly relates to a learning assistance apparatus and learning assistance method for assisting learning in a field for which on-site learning is regarded as being important, such as the agricultural field, and a computer-readable storage medium storing a program for realizing the learning assistance apparatus and the learning assistance method.

BACKGROUND ART

Conventionally, various tasks in the agricultural field have often been performed based on knowledge and know-how obtained through individual experience, and it has been difficult to transmit an individual's knowledge and know-how to another person. In particular, in a country such as Japan, which has complex topography and vastly different environments in each region, a great variety of knowledge and know-how exists and thus transmission is more difficult.

On the other hand, in recent years, a learning assistance system using a network has been proposed (e.g., Patent Document 1). According to the learning assistance system disclosed in Patent Document 1, by using a terminal apparatus to receive learning contents transmitted from a server apparatus, a learner can perform learning without being restricted by time.

Accordingly, if the learning assistance system disclosed in Patent Document 1 is applied to the agricultural field, an agricultural worker can learn a wide variety of accumulated knowledge and know-how without being restricted by time. As a result, it is thought that even if the agricultural worker has little experience, he or she can perform various tasks based on accurate knowledge and know-how, and therefore the above-described problem can be solved.

CITATION LIST

Patent Document

Patent Document 1: JP 2015-38581A

DISCLOSURE OF THE INVENTION

Problems to be Solved by the Invention

Incidentally, in the agricultural field, due to the fact that the knowledge and know-how to be learned are related to the worksite, it is thought that learning that is performed while seated at a desk indoors is not efficient. For this reason, in the agricultural field, efficient learning is performed by performing an actual task while checking problems and answers at the worksite.

However, since the learning system disclosed in Patent Document 1 envisions a case in which learning is performed while seated at a desk indoors, complicated labor is required of the learner and time is consumed from the time when the learner is presented with a problem until the time when the learner obtains the answer. For this reason, the learning system disclosed in Patent Document 1 is problematic in that it is not suitable for learning at the worksite.

It is an object of the present invention to provide a learning assistance apparatus, a learning assistance method, and a computer-readable storage medium according to which the above-described problems can be solved and knowledge and know-how can be transmitted efficiently to a learner in a field in which transmission of technical skills is needed.

Means for Solving the Problems

In order to achieve the above-described object, a learning assistance apparatus according to an aspect of the present invention includes:

a data acquisition unit configured to acquire a problem and an answer corresponding thereto from a data structure that includes the problem and the answer as data;

an operation reception unit configured to receive a first operation of moving a display region in a first direction, a second operation of moving the display region in a second direction, and a third operation of moving the display region in a third direction; and a display control unit configured to cause another problem to be displayed on a screen according to a movement when the first operation is received after the problem is displayed, cause the answer corresponding to the displayed problem to be displayed on the screen when the second operation is received after the problem is displayed, and cause another said problem to be displayed on the screen when the third operation is received after the answer is displayed due to the second operation.

Also, in order to achieve the above-described object, a learning assistance method according to an aspect of the present invention includes:

(a) a step of acquiring a problem and an answer corresponding thereto from a data structure that includes the problem and the answer as data;

(b) a step of receiving a first operation of moving a display region in a first direction, a second operation of moving the display region in a second direction, and a third operation of moving the display region in a third direction; and (c) a step of causing another problem to be displayed on a screen according to a movement when the first operation is received after the problem is displayed, causing the answer corresponding to the displayed problem to be displayed on the screen when the second operation is received after the problem is displayed, and causing another said problem to be displayed on the screen when the third operation is received after the answer is displayed due to the second operation.

Furthermore, in order to achieve the above-described object, a computer-readable storage medium according to an aspect of the present invention stores a program including commands for causing a computer to execute:

(a) a step of acquiring a problem and an answer corresponding thereto from a data structure that includes the problem and the answer as data;

(b) a step of receiving a first operation of moving a display region in a first direction, a second operation of moving the display region in a second direction, and a third operation of moving the display region in a third direction; and (c) a step of causing another problem to be displayed on a screen according to a movement when the first operation is received after the problem is displayed, causing the answer corresponding to the displayed problem to be displayed on the screen when the second operation is received after the problem is displayed, and causing another said problem to be displayed on the screen when the third operation is received after the answer is displayed due to the second operation.

Effects of the Invention

As described above, according to the present invention, knowledge and know-how can be efficiently transmitted to a learner in a field in which transmission of technical skills is needed.

DESCRIPTION OF EMBODIMENT

Embodiment

Hereinafter, a learning assistance apparatus, a learning assistance method, and a program according to an embodiment of the present invention will be described with reference to FIGS. 1 to 8.

Configuration of Apparatus

Figure 1:
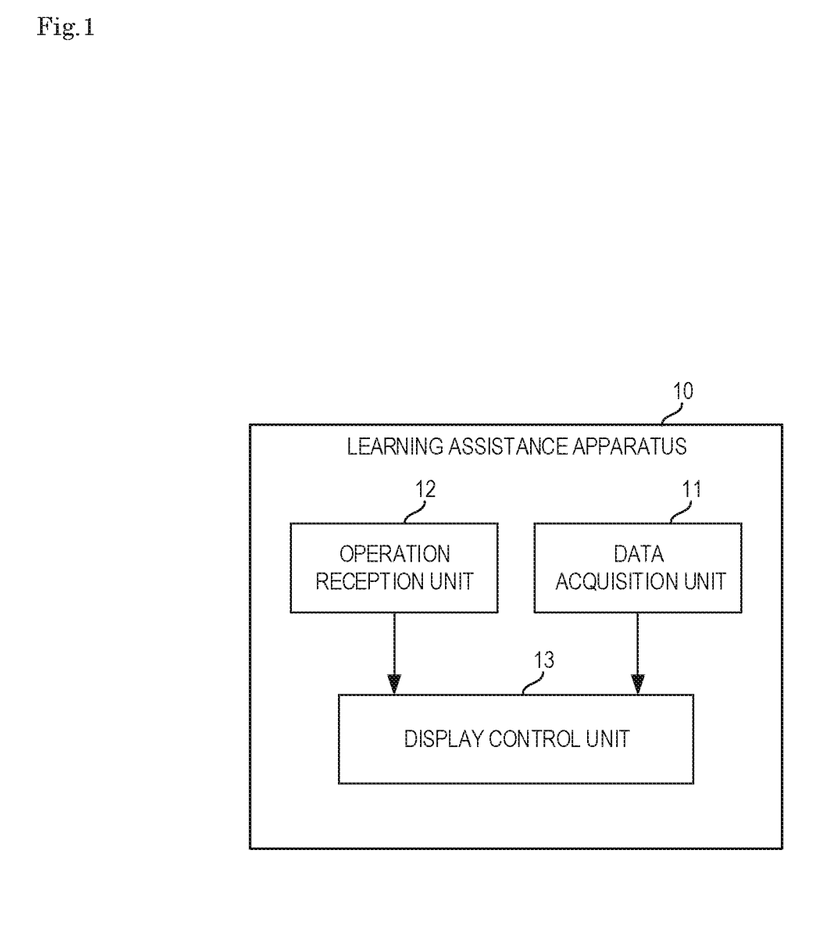
FIG. 1 is a block diagram schematically showing a configuration of a learning assistance apparatus according to an embodiment of the present invention.

First, a schematic configuration of a learning assistance apparatus according to the present embodiment will be described with reference to FIG. 1. FIG. 1 is a block diagram schematically showing a configuration of a learning assistance apparatus according to an embodiment of the present invention.

A learning assistance apparatus 10 according to the present embodiment shown in FIG. 1 is an apparatus that assists learning performed by a learner. As shown in FIG. 1, the learning assistance apparatus 10 includes a data acquisition unit 11, an operation reception unit 12, and a display control unit 13. Among these, the data acquisition unit 11 acquires problems and answers corresponding thereto from a data structure that includes the problems and the answers as data.

The operation reception unit 12 receives a first operation of moving a display region in a first direction, a second operation of moving a display region in a second direction, and a third operation of moving a display region in a third direction.

When the first operation is received after a problem is displayed, the display control unit 13 causes another problem to be displayed on the screen according to the movement. Also, when the second operation is received after a problem is displayed, the display control unit 13 causes an answer corresponding to the displayed problem to be displayed on the screen. Furthermore, when the third operation is received after the answer is displayed due to the second operation, the display control unit 13 causes another problem to be displayed on the screen.

Also, "display region" in this context means a region displayed on the screen, in a virtual region in which an object displaying a problem and an object displaying an answer are arranged. Accordingly, a problem or an answer is displayed on the screen according to the movement of the display region.

Thus, in the present embodiment, the operation for causing the problem to be displayed, the operation for causing the answer to be displayed, and the operation for causing the next problem to be displayed after the answer is displayed are set to be simple operations of moving objects on the screen in specific directions. Accordingly, the learner can check the problems and answers in a short amount of time with simple operations. For this reason, according to the present embodiment, knowledge and know-how can be efficiently transmitted to a learner in a field that is not suited for learning performed while seated at a desk indoors, such as a field in which transmission of technical skills is needed.

Figure 2:
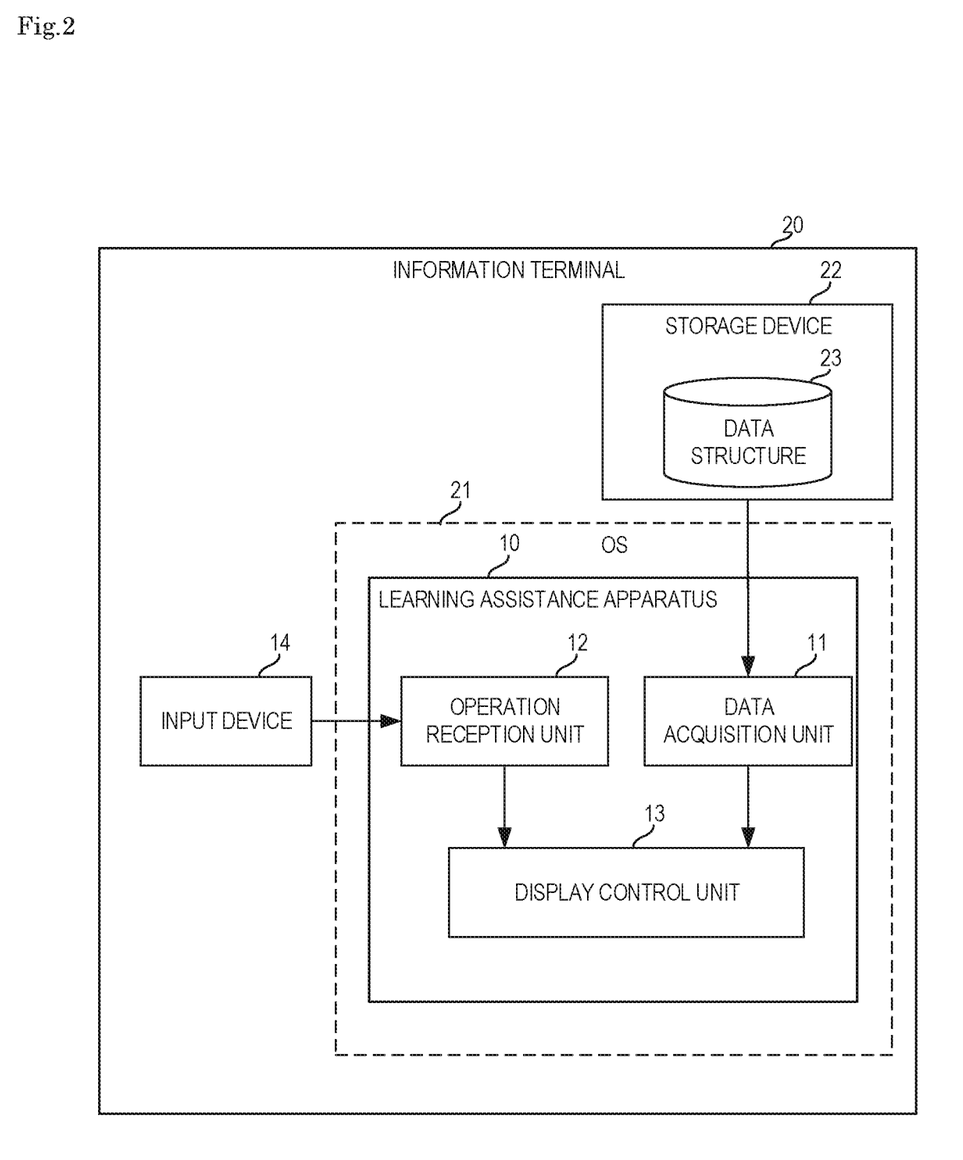
FIG. 2 is a block diagram showing a specific configuration of a learning assistance apparatus according to an embodiment of the present invention.
Figure 3:
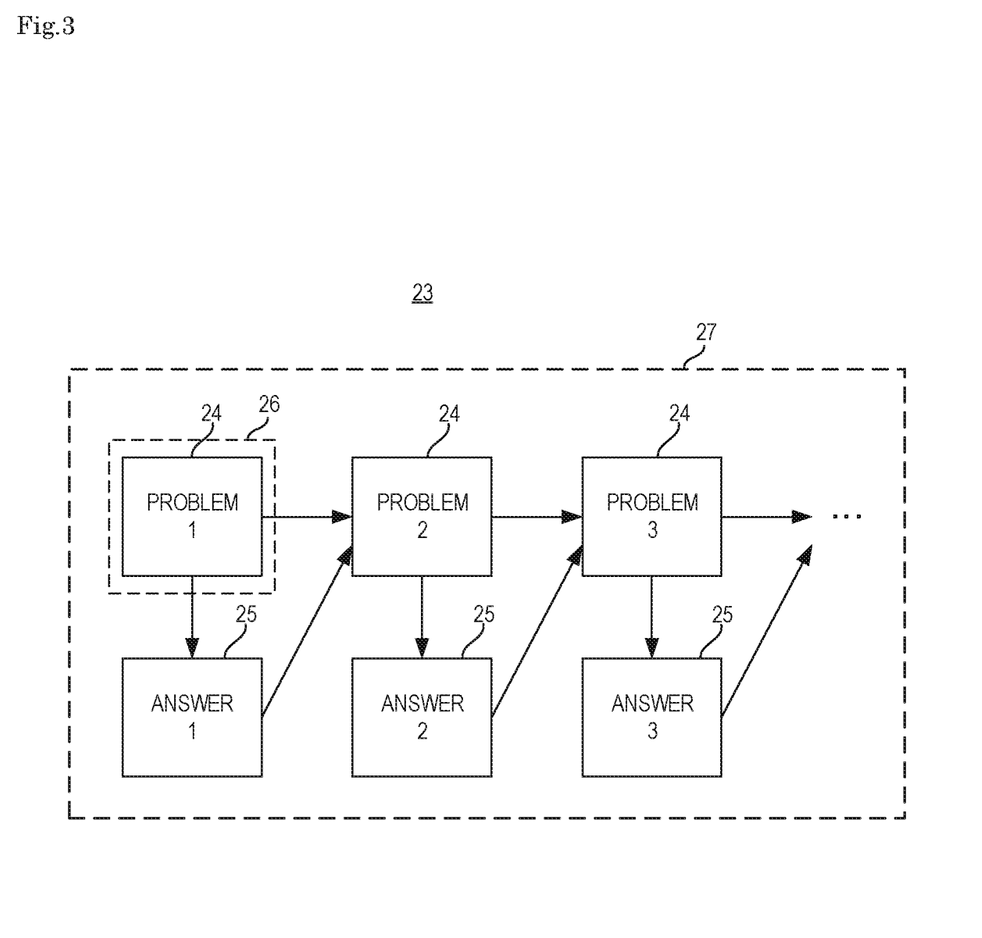
FIG. 3 is a diagram schematically showing an example of a screen according to a data structure used in an embodiment of the present invention.
Figure 4:
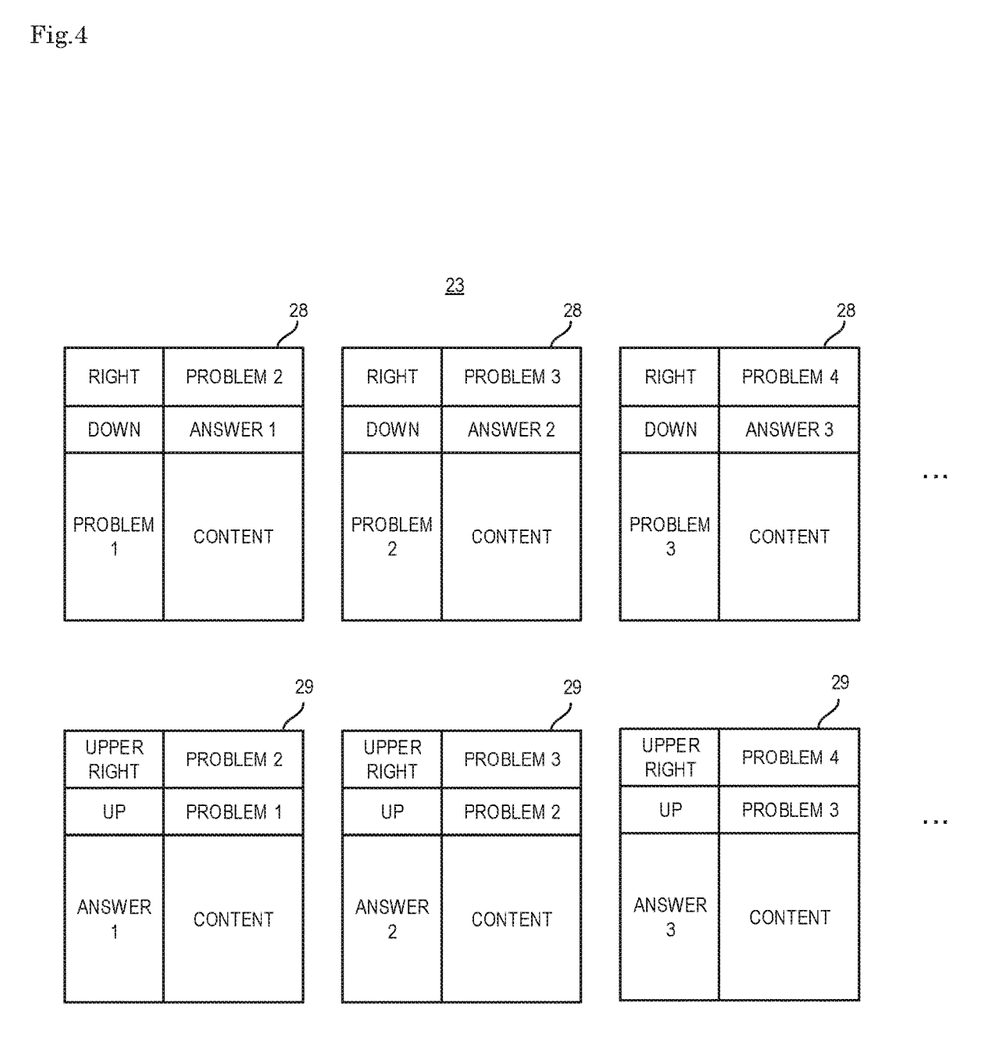
FIG. 4 is a diagram showing an example of a configuration of a data structure used in an embodiment of the present invention.

Next, the configuration of the learning assistance apparatus according to the present embodiment will be described in further detail with reference to FIGS. 2 to 4. FIG. 2 is a block diagram showing a specific configuration of a learning assistance apparatus according to an embodiment of the present invention. FIG. 3 is a diagram schematically showing an example of a screen according to a data structure used in an embodiment of the present invention. FIG. 4 is a diagram showing an example of a configuration of a data structure used in an embodiment of the present invention.

As shown in FIG. 2, in the present embodiment, the learning assistance apparatus 10 is constructed by a program in an OS (Operating System) 21 of an information terminal 20. For this reason, the learning assistance apparatus 10 can be realized by various information terminals. Examples of the information terminal 20 include a smartphone, a tablet terminal, a general-purpose computer, and furthermore, a wearable terminal.

As shown in FIG. 2, in the present embodiment, the operation reception unit 12 receives the operations via an input device 14 of the information terminal 20. Furthermore, the data structure 23 is stored in a storage device 22 of the information terminal 20, and the data acquisition unit 11 acquires the problems and answers by accessing the storage device 22.

Also, in the present embodiment, the display control unit 13 uses the acquired problems and answers to arrange objects for displaying the problems and objects for displaying the answers in the virtual region. Specifically, as shown in FIG. 3, the display control unit 13 uses the problems and answers acquired from the data structure 23 to construct pages 24 corresponding to the problems and pages 25 corresponding to the answers in a storage region 27 of a video memory of the information terminal 20. Also, the display control unit 13 sets a display region 26 in the storage region 27 and displays only the page that overlaps with the display region 26 among the pages 24 and the pages 25 on the screen (not shown in FIG. 2) of the information terminal 20.

Also, the display control unit 13 moves the display region 26 in response to the first operation to the third operation performed by the above-described learner. Specifically, the display control unit 13 moves the display region 26 to the right according to the first operation, moves the display region 26 downward according to the second operation, and moves the display region 26 upwards and to the right according to the third operation. In FIG. 3, the arrows show the movement directions of the display region 26.

Also, it is assumed that a touch panel is used as the input device 14 of the information terminal 20. In this case, the operation reception unit 12 receives a swipe operation in which the learner moves a finger in contact with the screen to the left as a first operation, and receives a swipe operation in which the learner moves a finger in contact with the screen upward as a second operation. Furthermore, the operation reception unit 12 receives a swipe operation in which the learner moves a finger in contact with the screen downward and to the left as a third operation.

Note that the layout of the pages of problems and answers is defined by the data structure 23, and the movements of the display region 26 performed by the display control unit 13 are restricted by the data structure 23. Specifically, as shown in FIG. 4, in the present embodiment, the data structure 23 includes data (hereinafter denoted as "problem data") 28 constituting the pages 24, which correspond to the problems, and data (hereinafter denoted as "answer data") 29 constituting the pages 25, which correspond to the answers.

Furthermore, as shown in FIG. 4, each piece of data includes the content of that piece of data, possible directions of movement from that piece of data, and the destinations of movement from that piece of data (page identifier). In other words, in the present embodiment, the display control unit 13 moves the display region 26 and displays a problem or an answer based on the possible directions of movement and the destinations of movement, which are defined by the data structure 23.

Specifically, if a first operation of moving the display region 26 to the right is received when "problem 1" is displayed on the screen, the display control unit 13 moves the display region 26 to the right, since "right" is registered in the problem data for problem 1 as a possible direction of movement. Also, the display control unit 13 displays "problem 2", which has been registered as the destination of movement, on the screen.

Also, "down" is registered as a possible direction of movement in the problem data 28, and an "answer" is registered as a destination of movement. Accordingly, if an operation of moving the display region 26 downward is received when a "problem" is displayed, the display control unit 13 displays an "answer", which is registered as the destination of movement, on the screen.

Thus, in the present embodiment, a possible direction of movement and a destination of movement are registered for each piece of data, and thereby the display region 26 can be moved according to the operations. Also, by registering possible directions of movement and destinations of movement as needed, it is also possible to move the display region using an operation other than the above-described first operation to third operation.

Specifically, in the example shown in FIG. 4, for the answer data 29, "up" is registered as a possible direction of movement, and a "corresponding problem" is registered as a destination of movement. Accordingly, if an operation (fourth operation) of moving the display region 26 upward is received when an "answer" is displayed, the display control unit 13 displays the "corresponding problem", which is registered as the destination of movement, on the screen.

For example, the agricultural field is given as an example of an application of the learning assistance apparatus 10 according to the present embodiment. In this case, examples of problems include a problem that is answered with a task that is to be executed in the agricultural field, and examples of answers include a task that is to be executed in the agricultural field. More specifically, the present invention is applied to mandarin orange cultivation. In this case, examples of problems include one in which an image of a mandarin orange tree with mandarin oranges growing on it is provided with the text "Select the fruits that are suitable for picking". An example of a corresponding answer is an image of the mandarin orange tree in which the fruits that are suitable for picking have been selected.

Operations of Apparatus

Figure 5:
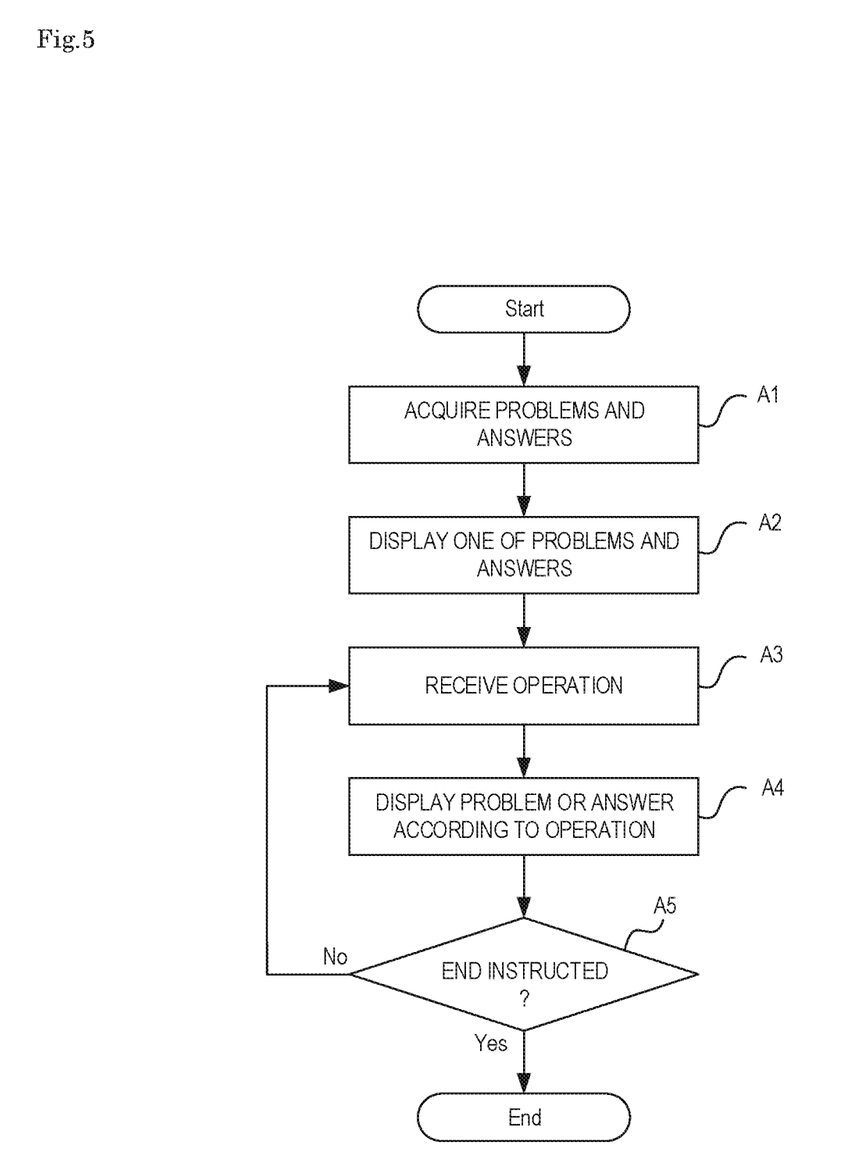
FIG. 5 is a flow diagram showing operations performed by a learning assistance apparatus 10 according to an embodiment of the present invention.

Next, operations performed by the learning assistance apparatus 10 according to an embodiment of the present invention will be described with reference to FIG. 5. FIG. 5 is a flow diagram showing operations performed by a learning assistance apparatus 10 according to an embodiment of the present invention. In the following description, FIGS. 1 to 4 will be referenced as needed. In the present embodiment, a learning assistance method is carried out by causing the learning assistance apparatus 10 to operate. Accordingly, the description of the learning assistance method according to the present embodiment will be substituted with the following description of the operations performed by the learning assistance apparatus 10.

As shown in FIG. 5, first, when the learner instructs the start of learning in the learning assistance apparatus 10, the data acquisition unit 11 accesses the storage device 22 to acquire the problem data 28 and the answer data 29, which are included in the data structure 23 (step A1).

Next, the display control unit 13 selects one piece of the acquired problem data 28 and answer data 29 and displays a problem or an answer on the screen using the selected piece of problem data 28 or answer data 29 (step A2). Note that the problem data 28 and the answer data 29 may be selected according to an instruction given by the learner, or may be selected so as to continue from a previous instance of learning. Furthermore, the problem data 28 for the problem provided with the lowest number may be selected.

Next, the operation reception unit 12 receives an operation performed by the learner, which is input via the input device 14 (step A3). Then, the operation reception unit 12 inputs the content of the received operation to the display control unit 13.

Next, the display control unit 13 compares the operation received in step A3 and the possible directions of movement and the destinations of movement in the data currently being displayed and specifies the problem or the answer that is to be displayed next. Also, the display control unit 13 moves the display region 26 according to the operation and displays the specified problem or answer (step A4).

If step A4 has been executed, the display control unit 13 determines whether or not the end of processing has been instructed (step A5). If it is determined that the end of processing has not been instructed, the display control unit 13 causes the operation reception unit 12 to execute step A3 once again. On the other hand, if it is determined that the end of processing has been instructed, the display control unit 13 ends the processing.

Effects of Embodiment

Thus, in the present embodiment, the learner can check the problems and answers using only simple predetermined operations, and therefore it is possible to efficiently perform learning. In other words, according to the present embodiment, at the worksite, the learner can easily search for a problem related to knowledge needed at that time, and can quickly acquire the answer. For this reason, according to the present embodiment, knowledge and know-how can be efficiently transmitted to the learner in a field in which on-site learning is effective, such as the agricultural field in particular.

Modified Example 1

Figure 6:
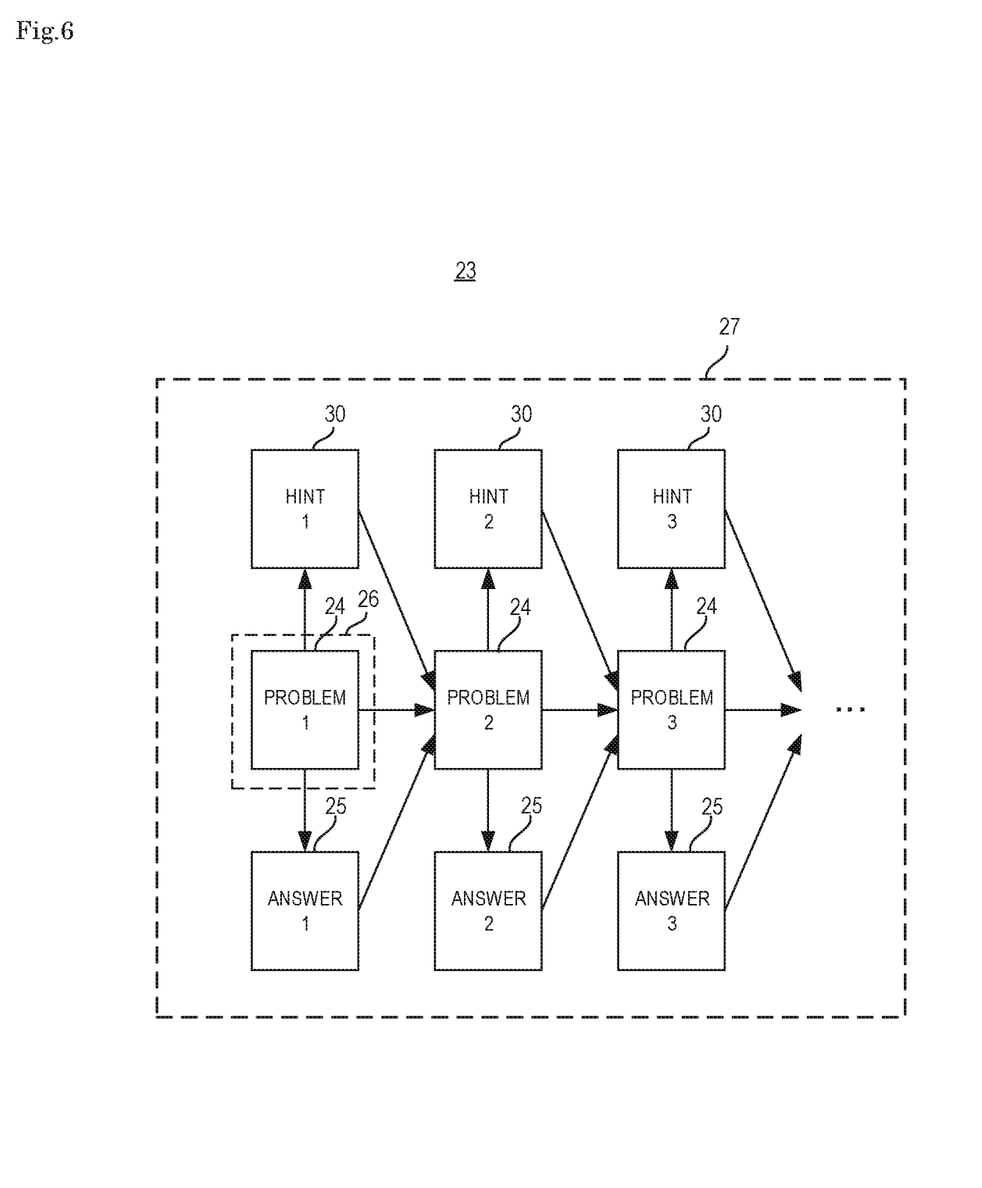
FIG. 6 is a diagram schematically showing an example of a screen according to a data structure used in Modified Example 1 of an embodiment of the present invention.

Here, Modified Example 1 of the present embodiment will be described with reference to FIG. 6. FIG. 6 is a diagram schematically showing an example of a screen according to a data structure used in Modified Example 1 of the embodiment of the present invention.

As shown in FIG. 6, in Modified Example 1, unlike the examples shown in FIGS. 3 and 4, the data structure 23 includes not only problems and answers, but also hints to the problems as data. Specifically, in Modified Example 1, in addition to the pages 24 corresponding to the problems and the pages 25 corresponding to the answers, pages 30 corresponding to the hints to the problems are constructed in the storage region 27 of the video memory of the information terminal 20 according to the data structure 23. Accordingly, hints can be displayed on the screen by moving the display region 26.

Also, in Modified Example 1, the operation reception unit 12 furthermore receives a fourth operation of moving the display region 26 upward and a fifth operation of moving the display region 26 downward and to the right. Then, when a fourth operation is received after a problem is displayed, the display control unit 13 causes a hint corresponding to the displayed problem to be displayed on the screen. Also, when the fifth operation is received after the hint is displayed due to the fourth operation, the display control unit 13 causes another problem to be displayed on the screen.

Thus, according to Modified Example 1, since hints are also displayed on the screen in addition to problems and answers, the learner thinks more deeply about the problems based on the hints. As a result, the learner can more effectively acquire knowledge, know-how, and the like.

Modified Example 2

Figure 7:
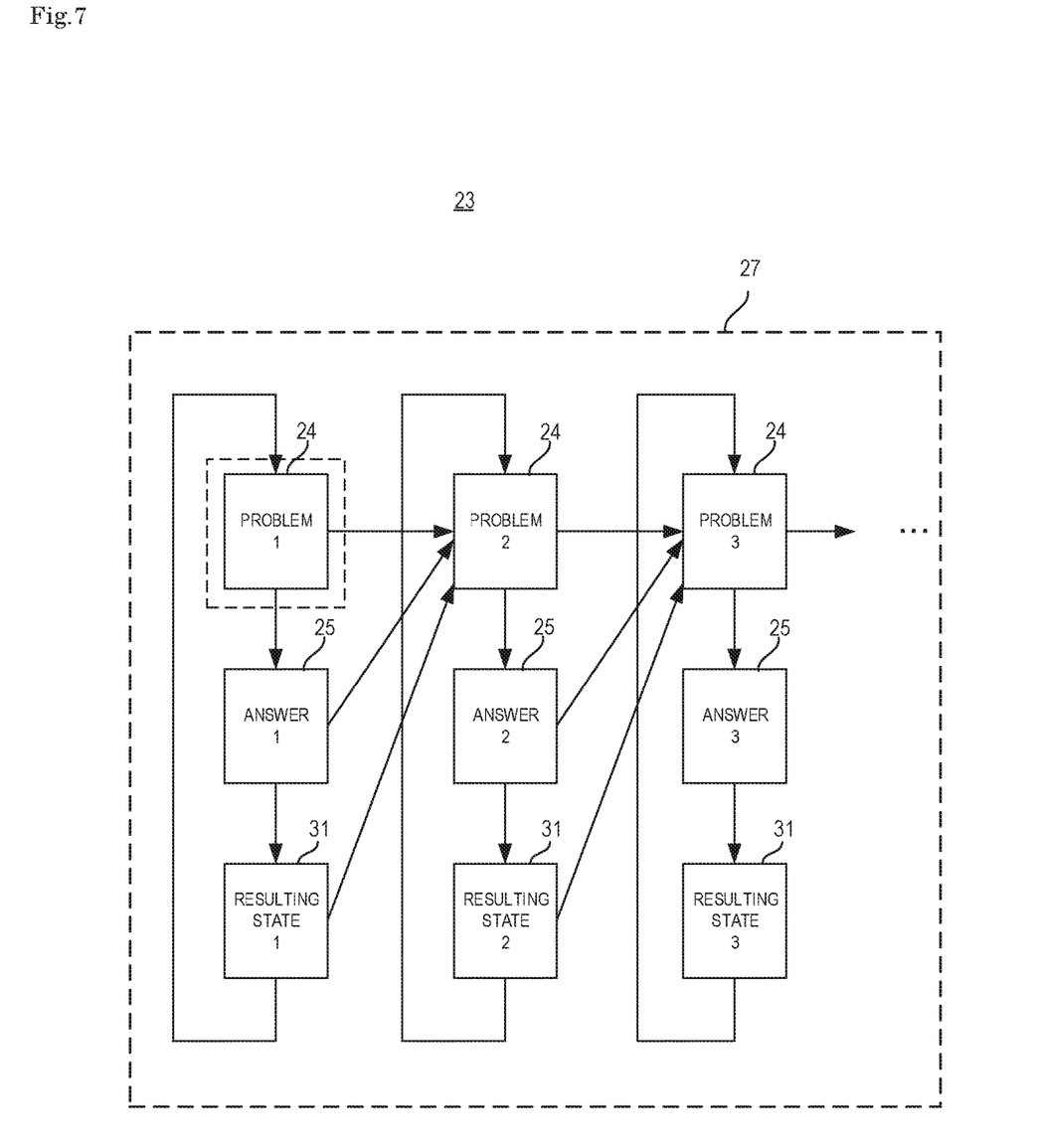
FIG. 7 is a diagram schematically showing an example of a screen according to a data structure used in Modified Example 2 of an embodiment of the present invention.

Next, Modified Example 2 according to the present embodiment will be described with reference to FIG. 7. FIG. 7 is a diagram schematically showing an example of a screen according to a data structure used in Modified Example 2 of the embodiment of the present invention.

Modified Example 2 shown in FIG. 7 is applied in the case where the data structure 23 includes problems that are answered with tasks to be executed in the agricultural field as the problems, and the data structure 23 includes tasks to be executed in the agricultural field as the answers. Also, as shown in FIG. 7, in Modified Example 2, the data structure 23 includes data that indicates a "predicted state" after execution of the task to be executed in the agricultural field.

Specifically, for example, if the problem is "Which branch should be pruned?" and the answer is "the branch to be pruned", an example of the data indicating the "predicted state" is image data of a photograph taken one year after pruning.

Also, in Modified Example 2, when a second operation is further received after the answer is displayed, the display control unit 13 causes the "predicted state" corresponding to the displayed answer to be displayed on the screen. Furthermore, when a second operation is further received after the "predicted state" is displayed, the display control unit 13 causes the original problem to be displayed on the screen. Also, when a third operation is further received after the "predicted state" is displayed due to the second operation, the display control unit 13 causes another problem to be displayed on the screen.

Thus, according to Modified Example 2, the learner can recognize what kind of effect can be obtained if the learner uses the knowledge obtained through learning. According to Modified Example 2, the learner can more efficiently acquire knowledge, know-how, and the like.

Program

It is sufficient that a program according to the present embodiment is a program that causes a computer to execute steps A1 to A5 shown in FIG. 5. By installing the program on a computer and executing it, it is possible to realize the learning assistance apparatus 10 and the learning assistance method according to the present embodiment. In this case, the CPU (Central Processing Unit) of the computer functions as the operation reception unit 12, the data acquisition unit 11, and the display control unit 13, and performs processing.

Figure 8:
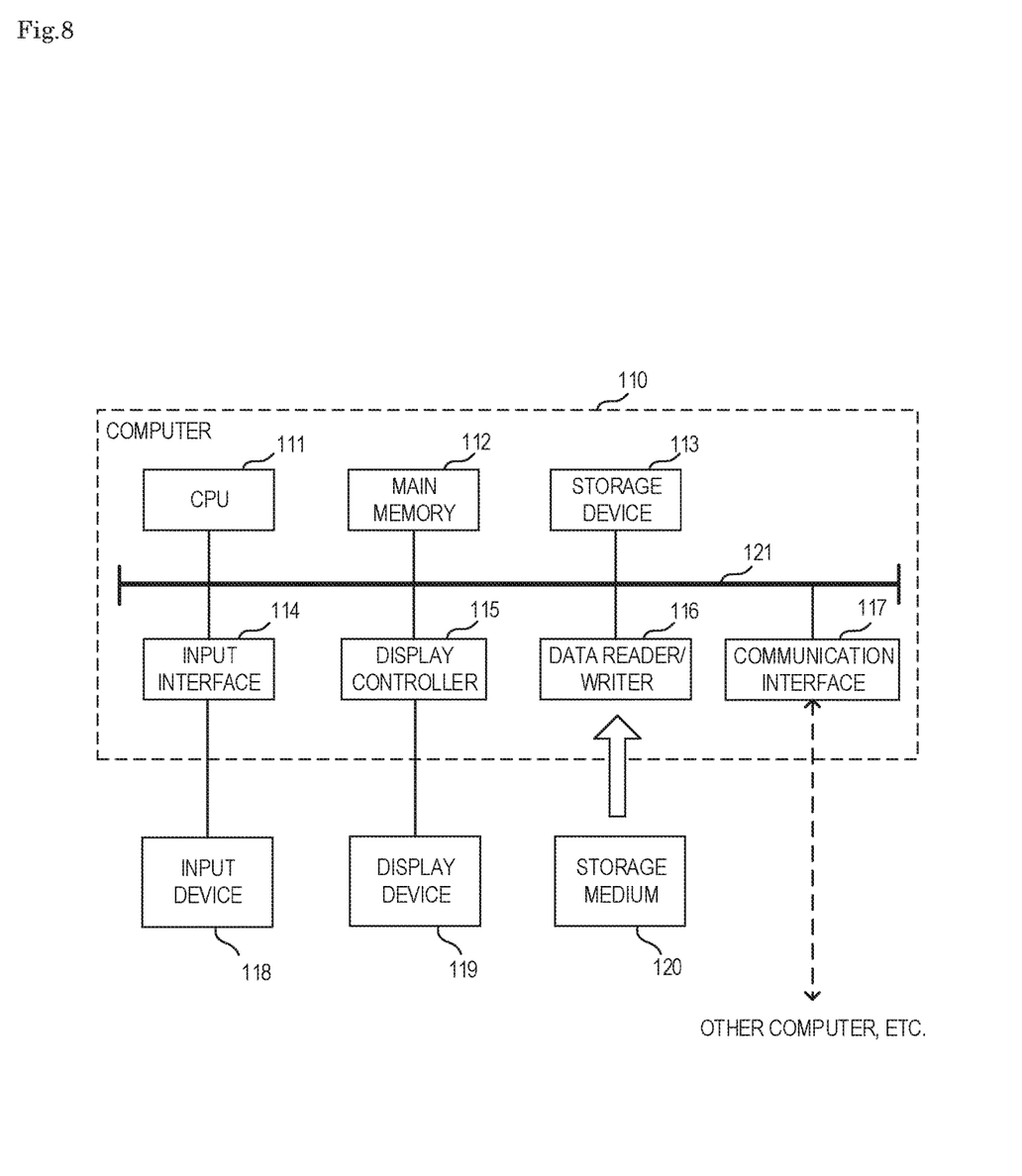
FIG. 8 is a block diagram showing an example of a computer that realizes a learning assistance apparatus according to an embodiment of the present invention.

Here, a computer that realizes the learning assistance apparatus by executing the program according to the present embodiment will be described with reference to FIG. 8. FIG. 8 is a block diagram showing an example of a computer that realizes the learning assistance apparatus according to an embodiment of the present invention.

Note that the computer that realizes the learning assistance apparatus and the learning assistance method in the present embodiment is not limited to that shown in FIG. 8. The computer that realizes the learning assistance apparatus and the learning assistance method need only be able to execute the program according to the present embodiment, and may be a computer installed in a smartphone, a tablet terminal, or a wearable terminal.

As shown in FIG. 8, the computer 110 includes a CPU 111, a main memory 112, a storage device 113, an input interface 114, a display controller 115, a data reader/writer 116, and a communication interface 117. These units are connected to each other via a bus 121 so as to be able to perform data communication.

The CPU 111 carries out various calculations by expanding programs (codes) according to the present embodiment, which are stored in the storage device 113, to the main memory 112 and executing them in a predetermined sequence. The main memory 112 is typically a volatile storage device such as a DRAM (Dynamic Random Access Memory). Also, the program according to the present embodiment is provided in a state of being stored in a computer-readable storage medium 120. Note that the program according to the present embodiment may be distributed over the Internet, which is connected to via the communication interface 117.

Also, specific examples of the storage device 113 include a semiconductor storage device such as a flash memory, in addition to a hard disk drive. The input interface 114 mediates data transmission between the CPU 111 and an input device 118 such as a keyboard or a mouse. The display controller 115 is connected to a display device 119 and controls display on the display device 119.

The data reader/writer 116 mediates data transmission between the CPU 111 and the storage medium 120, reads out programs from the storage medium 120, and writes results of processing performed by the computer 110 in the storage medium 120. The communication interface 117 mediates data transmission between the CPU 111 and another computer.

Also, specific examples of the storage medium 120 include a general-purpose semiconductor storage device such as CF (Compact Flash (registered trademark)) and SD (Secure Digital), a magnetic storage medium such as a flexible disk, and an optical storage medium such as a CD-ROM (Compact Disk Read Only Memory).

The above-described embodiment can be partially or entirely expressed by, but is not limited to, the following Supplementary Notes 1 to 15.

Supplementary Note 1

A learning assistance apparatus including:

a data acquisition unit configured to acquire a problem and an answer corresponding thereto from a data structure that includes the problem and the answer as data;

an operation reception unit configured to receive a first operation of moving a display region in a first direction, a second operation of moving the display region in a second direction, and a third operation of moving the display region in a third direction; and a display control unit configured to cause another problem to be displayed on a screen according to a movement when the first operation is received after the problem is displayed, cause the answer corresponding to the displayed problem to be displayed on the screen when the second operation is received after the problem is displayed, and cause another said problem to be displayed on the screen when the third operation is received after the answer is displayed due to the second operation.

Supplementary Note 2

The learning assistance apparatus according to Supplementary Note 1, wherein the data structure further includes a hint corresponding to the problem as data, the operation reception unit further receives a fourth operation of moving the display region in a fourth direction and a fifth operation of moving the display region in a fifth direction, and the display control unit causes the hint corresponding to the displayed problem to be displayed on a screen when the fourth operation is received after the problem is displayed, and causes another said problem to be displayed on the screen when the fifth operation is received after the hint is displayed due to the fourth operation.

Supplementary Note 3

The learning assistance apparatus according to Supplementary Note 1, wherein the data structure includes, as the problem, a problem that is answered with a task to be executed in an agricultural field, and furthermore includes, as the answer, the task to be executed in the agricultural field.

Supplementary Note 4

The learning assistance apparatus according to Supplementary Note 3, wherein the data structure further includes data indicating a state that is predicted after execution of the task to be executed in the agricultural field, and the display control unit causes the predicted state, which corresponds to the displayed answer, to be displayed on the screen when the second operation is further received after the answer is displayed, and causes another said problem to be displayed on the screen when the third operation is further received after the predicted state is displayed due to the second operation.

Supplementary Note 5

The learning assistance apparatus according to Supplementary Note 1, wherein in the data structure, each piece of data includes content of the data, a possible direction of movement from the data, and a destination of movement from the data, and when an operation is received, the display control unit causes a problem or an answer to be displayed based on the possible direction of movement and the destination of movement in the displayed data.

Supplementary Note 6

A learning assistance method including:

(a) a step of acquiring a problem and an answer corresponding thereto from a data structure that includes the problem and the answer as data;

(b) a step of receiving a first operation of moving a display region in a first direction, a second operation of moving the display region in a second direction, and a third operation of moving the display region in a third direction; and (c) a step of causing another problem to be displayed on a screen according to a movement when the first operation is received after the problem is displayed, causing the answer corresponding to the displayed problem to be displayed on the screen when the second operation is received after the problem is displayed, and causing another said problem to be displayed on the screen when the third operation is received after the answer is displayed due to the second operation.

Supplementary Note 7

The learning assistance method according to Supplementary Note 6, wherein the data structure further includes a hint corresponding to the problem as data, in the step (b), a fourth operation of moving the display region in a fourth direction and a fifth operation of moving the display region in a fifth direction are further received, and in the step (c), the hint corresponding to the displayed problem is displayed on a screen when the fourth operation is received after the problem is displayed, and another said problem is displayed on the screen when the fifth operation is received after the hint is displayed due to the fourth operation.

Supplementary Note 8

The learning assistance method according to Supplementary Note 6, wherein the data structure includes, as the problem, a problem that is answered with a task to be executed in an agricultural field, and furthermore includes, as the answer, the task to be executed in the agricultural field.

Supplementary Note 9

The learning assistance method according to Supplementary Note 8, wherein the data structure further includes data indicating a state that is predicted after execution of the task to be executed in the agricultural field, and in the step (c), the predicted state corresponding to the displayed answer is displayed on the screen when the second operation is further received after the answer is displayed, and another said problem is displayed on the screen when the third operation is further received after the predicted state is displayed due to the second operation.

Supplementary Note 10

The learning assistance method according to Supplementary Note 6, wherein in the data structure, each piece of data includes content of the data, a possible direction of movement from the data, and a destination of movement from the data, and in the step (c), a problem or an answer is displayed based on the possible direction of movement and the destination of movement in the displayed data when an operation is received.

Supplementary Note 11

A computer-readable storage medium storing a program that includes commands for causing a computer to execute:

(a) a step of acquiring a problem and an answer corresponding thereto from a data structure that includes the problem and the answer as data;

(b) a step of receiving a first operation of moving a display region in a first direction, a second operation of moving the display region in a second direction, and a third operation of moving the display region in a third direction; and (c) a step of causing another problem to be displayed on a screen according to a movement when the first operation is received after the problem is displayed, causing the answer corresponding to the displayed problem to be displayed on the screen when the second operation is received after the problem is displayed, and causing another said problem to be displayed on the screen when the third operation is received after the answer is displayed due to the second operation.

Supplementary Note 12

The computer-readable storage medium according to Supplementary Note 11, wherein the data structure further includes a hint corresponding to the problem as data, in the step (b), a fourth operation of moving the display region in a fourth direction and a fifth operation of moving the display region in a fifth direction are further received, and in the step (c), the hint corresponding to the displayed problem is displayed on a screen when the fourth operation is received after the problem is displayed, and another said problem is displayed on the screen when the fifth operation is received after the hint is displayed due to the fourth operation.

Supplementary Note 13

The computer-readable storage medium according to Supplementary Note 11, wherein the data structure includes, as the problem, a problem that is answered with a task to be executed in an agricultural field, and furthermore includes, as the answer, the task to be executed in the agricultural field.

Supplementary Note 14

The computer-readable storage medium according to Supplementary Note 13, wherein the data structure further includes data indicating a state that is predicted after execution of the task to be executed in the agricultural field, and in the step (c), the predicted state corresponding to the displayed answer is displayed on the screen when the second operation is further received after the answer is displayed, and another said problem is displayed on the screen when the third operation is further received after the predicted state is displayed due to the second operation.

Supplementary Note 15

The computer-readable storage medium according to Supplementary Note 11, wherein in the data structure, each piece of data includes content of the data, a possible direction of movement from the data, and a destination of movement from the data, and in the step (c), a problem or an answer is displayed based on the possible direction of movement and the destination of movement in the displayed data when an operation is received.

Although the present invention has been described with reference to an embodiment, the present invention is not limited to the above-described embodiment. Various modifications that a person skilled in the art can understand may be applied to the configuration and the details of the present invention within the scope of the present invention.

This application claims priority to Japanese Patent Application No. 2015-064256, filed on Mar. 26, 2015, the disclosure of which is incorporated in its entirety herein by reference.

INDUSTRIAL APPLICABILITY

As described above, according to the present invention, knowledge and know-how can be efficiently transmitted to a learner in a field in which transmission of technical skills is needed. The present invention is useful in fields in which technical skills are needed at a worksite, such as the agricultural field, the medical field, and the architectural field.

DESCRIPTIONS OF REFERENCE NUMERALS

10 Learning assistance apparatus
11 Operation reception unit
12 Data acquisition unit
13 Display control unit
14 Input device
20 Information terminal
21 OS
22 Storage device
23 Data structure
24 Page corresponding to a problem
25 Page corresponding to an answer
26 Display region
27 Storage region
28 Problem data
29 Answer data
30 Page corresponding to a hint
110 Computer
111 CPU
112 Main memory
113 Storage device
114 Input interface
115 Display controller
116 Data reader/writer
117 Communication interface
118 Input device
119 Display device
120 Storage medium
121 Bus

What is claimed is:

1. A learning assistance apparatus comprising:
a data acquisition unit configured to acquire a first problem and an answer corresponding thereto from a data structure that includes the first problem and the answer as data;
an operation reception unit configured to receive a first operation of moving a display region in a first direction, a second operation of moving the display region in a second direction, and a third operation of moving the display region in a third direction; and a display control unit configured to cause a second problem to be displayed on a screen according to a movement when the first operation is received after the first problem is displayed, cause the answer corresponding to the first problem to be displayed on the screen when the second operation is received after the first problem is displayed, and cause a third problem to be displayed on the screen when the third operation is received after the answer is displayed due to the second operation, wherein the data structure includes, as the first problem, a problem that is answered with a task to be executed in an agricultural field, and furthermore includes, as the answer, the task to be executed in the agricultural field, and wherein the learning assistance apparatus is realized by a computer having a processor, the processor of the computer functioning as the data acquisition unit, the operation reception unit, and the display control unit.

2. The learning assistance apparatus according to claim 1, wherein the data structure further includes a hint corresponding to the first problem as data, the operation reception unit further receives a fourth operation of moving the display region in a fourth direction and a fifth operation of moving the display region in a fifth direction, and the display control unit causes the hint corresponding to the first problem to be displayed on a screen when the fourth operation is received after the first problem is displayed, and causes the third problem to be displayed on the screen when the fifth operation is received after the hint is displayed due to the fourth operation.

3. The learning assistance apparatus according to claim 1, wherein the data structure further includes data indicating a state that is predicted after execution of the task to be executed in the agricultural field, and the display control unit causes the predicted state, which corresponds to the displayed answer, to be displayed on the screen when the second operation is further received after the answer is displayed, and causes the third problem to be displayed on the screen when the third operation is further received after the predicted state is displayed due to the second operation.

4. The learning assistance apparatus according to claim 1, wherein in the data structure, each piece of data includes content of the data, a possible direction of movement from the data, and a destination of movement from the data, and when an operation is received, the display control unit causes a specific problem or a specific answer to be displayed based on the possible direction of movement and the destination of movement in the displayed data.

5. A learning assistance method comprising:

(a) a step of acquiring a first problem and an answer corresponding thereto from a data structure that includes the first problem and the answer as data;

(b) a step of receiving a first operation of moving a display region in a first direction, a second operation of moving the display region in a second direction, and a third operation of moving the display region in a third direction; and (c) a step of causing a second problem to be displayed on a screen according to a movement when the first operation is received after the first problem is displayed, causing the answer corresponding to the first problem to be displayed on the screen when the second operation is received after the first problem is displayed, and causing a third problem to be displayed on the screen when the third operation is received after the answer is displayed due to the second operation, wherein the data structure includes, as the first problem, a problem that is answered with a task to be executed in an agricultural field, and furthermore includes, as the answer, the task to be executed in the agricultural field.

6. The learning assistance method according to claim 5, wherein the data structure further includes a hint corresponding to the first problem as data, in the step (b), a fourth operation of moving the display region in a fourth direction and a fifth operation of moving the display region in a fifth direction are further received, and in the step (c), the hint corresponding to the first problem is displayed on a screen when the fourth operation is received after the first problem is displayed, and the third another said problem is displayed on the screen when the fifth operation is received after the hint is displayed due to the fourth operation.

7. The learning assistance method according to claim 5, wherein the data structure further includes data indicating a state that is predicted after execution of the task to be executed in the agricultural field, and in the step (c), the predicted state corresponding to the displayed answer is displayed on the screen when the second operation is further received after the answer is displayed, and the third problem is displayed on the screen when the third operation is further received after the predicted state is displayed due to the second operation.

8. The learning assistance method according to claim 5, wherein in the data structure, each piece of data includes content of the data, a possible direction of movement from the data, and a destination of movement from the data, and in the step (c), a specific problem or a specific answer is displayed based on the possible direction of movement and the destination of movement in the displayed data when an operation is received.

9. A non-transitory computer-readable storage medium storing a program that includes commands for causing a computer to execute:

(a) a step of acquiring a first problem and an answer corresponding thereto from a data structure that includes the first problem and the answer as data;

(b) a step of receiving a first operation of moving a display region in a first direction, a second operation of moving the display region in a second direction, and a third operation of moving the display region in a third direction; and (c) a step of causing a second problem to be displayed on a screen according to a movement when the first operation is received after the first problem is displayed, causing the answer corresponding to the first problem to be displayed on the screen when the second operation is received after the first problem is displayed, and causing a third problem to be displayed on the screen when the third operation is received after the answer is displayed due to the second operation, wherein the data structure includes, as the first problem, a problem that is answered with a task to be executed in an agricultural field, and furthermore includes, as the answer, the task to be executed in the agricultural field.

10. The non-transitory computer-readable storage medium according to claim 9, wherein the data structure further includes a hint corresponding to the first problem as data, in the step (b), a fourth operation of moving the display region in a fourth direction and a fifth operation of moving the display region in a fifth direction are further received, and in the step (c), the hint corresponding to the first problem is displayed on a screen when the fourth operation is received after the first problem is displayed, and the third problem is displayed on the screen when the fifth operation is received after the hint is displayed due to the fourth operation.

11. The non-transitory computer-readable storage medium according to claim 9, wherein the data structure further includes data indicating a state that is predicted after execution of the task to be executed in the agricultural field, and in the step (c), the predicted state corresponding to the displayed answer is displayed on the screen when the second operation is further received after the answer is displayed, and the third problem is displayed on the screen when the third operation is further received after the predicted state is displayed due to the second operation.

12. The non-transitory computer-readable storage medium according to claim 9, wherein in the data structure, each piece of data includes content of the data, a possible direction of movement from the data, and a destination of movement from the data, and in the step (c), a specific problem or a specific answer is displayed based on the possible direction of movement and the destination of movement in the displayed data when an operation is received.

* * * * *